Jean Pierre Magnin
INVENTOR.

BY Richard E. Bee

ATTORNEY

TELEMETERING SIGNAL PROCESSING SYSTEM

Filed Jan. 22, 1962 6 Sheets-Sheet 2

Jean Pierre Magnin
INVENTOR.

BY Richard E. Bee

ATTORNEY

Jean Pierre Magnin
INVENTOR.

BY Richard E. Bee

ATTORNEY

TELEMFTERING SIGNAL PROCESSING SYSTEM

Filed Jan. 22, 1962 6 Sheets-Sheet 4

Jean Pierre Magnin
INVENTOR.

BY Richard E. Bee

ATTORNEY

Jean Pierre Magnin
INVENTOR.

BY Richard E. Bee

ATTORNEY

April 11, 1967 J. P. MAGNIN 3,313,922

TELEMETERING SIGNAL PROCESSING SYSTEM

Filed Jan. 22, 1962 6 Sheets-Sheet 6

Jean Pierre Magnin
INVENTOR.

BY Richard E. Bee

ATTORNEY

United States Patent Office 3,313,922
Patented Apr. 11, 1967

3,313,922
TELEMETERING SIGNAL PROCESSING SYSTEM
Jean P. Magnin, Sarasota, Fla., assignor to Electro-Mechanical Research, Inc., Sarasota, Fla., a corporation of Connecticut
Filed Jan. 22, 1962, Ser. No. 167,643
12 Claims. (Cl. 235—92)

This invention relates to telemetering systems and, particularly, to systems of the type for processing pulse-type telemetering signals.

Various types of telemetering systems have been heretofore proposed for generating, transmitting, receiving and decoding pulse-type data signals. Such systems have employed various forms of modulation for the pulses which constitute the data signal. Some have employed pulse amplitude modulation (PAM), others pulse duration modulation (PDM), others pulse code modulation (PCM), others pulse position modulation (PPM), others pulse frequency modulation (PFM) and some have employed pulse number modulation (PNM). Some types, such as pulse code modulation, may appear in various forms. In particular, pulse code modulated signals may be of the "return-to-zero" (RZ) type, the "non-return-to-zero" (NRZ) type or the NRZI type where the presence or absence of a signal transition or impulse is the significant factor. Also, since each pulse code data unit is made up of a plural-bit pulse group, the individual pulses in each group may appear one after the other in a serial manner on the same line or, instead, all at the same time in a parallel manner on separate lines.

It has been found that in some cases it would be more advantageous to use one type of pulse modulation at one point in a telemetering system and another type at another point in the same overall system. It would be desirable, therefore, to have some means for converting the data signal from one type of pulse modulation to another.

In view of the various types of pulse modulation signals that may be transmitted, it would also be desirable to have a more or less universal type of decoding system which would be capable of decoding more than one type of pulse modulation. The provision of some means for converting from one type of pulse modulation to another type would be particularly advantageous in this situation. It would enable various types of transmitted modulation to be converted to a single common type and thereby reduce the number of circuits which would otherwise be required.

Another problem which is particularly bothersome where data from several different data sources is transmitted in a time-multiplexed or time-shared manner is that both the number of data sources and the time allotted to each data source is subject to rather wide variation from one application to another. This problem becomes even more complex for the case of pulse code modulation where the number of bits in the individual plural-bit pulse groups is also subject to variation. The possibility of variation in these signal parameters considerably complicates the problem of synchronizing any signal converting or signal decoding operations with the timing of the various elements in the data signal. It would be desirable, therefore, to provide synchronizing means which can be used with telemetering signals having a relatively wide range of variation both in the number and timing of the various elements thereof.

It is an object of the invention, therefore, to provide a new and improved signal processing system for use with pulse-type telemetering signals.

It is another object of the invention to provide a new and improved signal processing system for converting pulse-type telemetering signals from one form of pulse modulation to another.

It is a further object of the invention to provide a new and improved signal processing system for use with pulse-type telemetering signals having a relatively wide range of differences in both the number and timing of their various signal elements.

It is an additional object of the invention to provide a new and improved signal processing system which may be used with other telemetering decoder apparatus to increase the number of types of signals which may be decoded by such apparatus.

In accordance with the invention, a telemetering signal processing system comprises circuit means for supplying a serial pulse code signal. The system also includes a plural-bit shift register and circuit means for reading the serial pulse code signal into the shift register for providing a parallel representation thereof. The system further includes a plural-bit pulse counter and circuit means for transferring the complement of the shift register signal representation to the pulse counter. The system additionally includes a pulse generator and circuit means for enabling the pulse generator to supply pulses to the pulse counter for counting thereby. The system also includes circuit means coupled to both the enabling circuit means and the output of the pulse counter for developing an output pulse having a duration representative of the data value represented by the pulse code signal.

For a better understanding of the present invention, together with other and further objects thereof, reference is had to the following description taken in connection with the accompanying drawings, the scope of the invention being pointed out in the appended claims.

Referring to the drawings.

Figure 1:
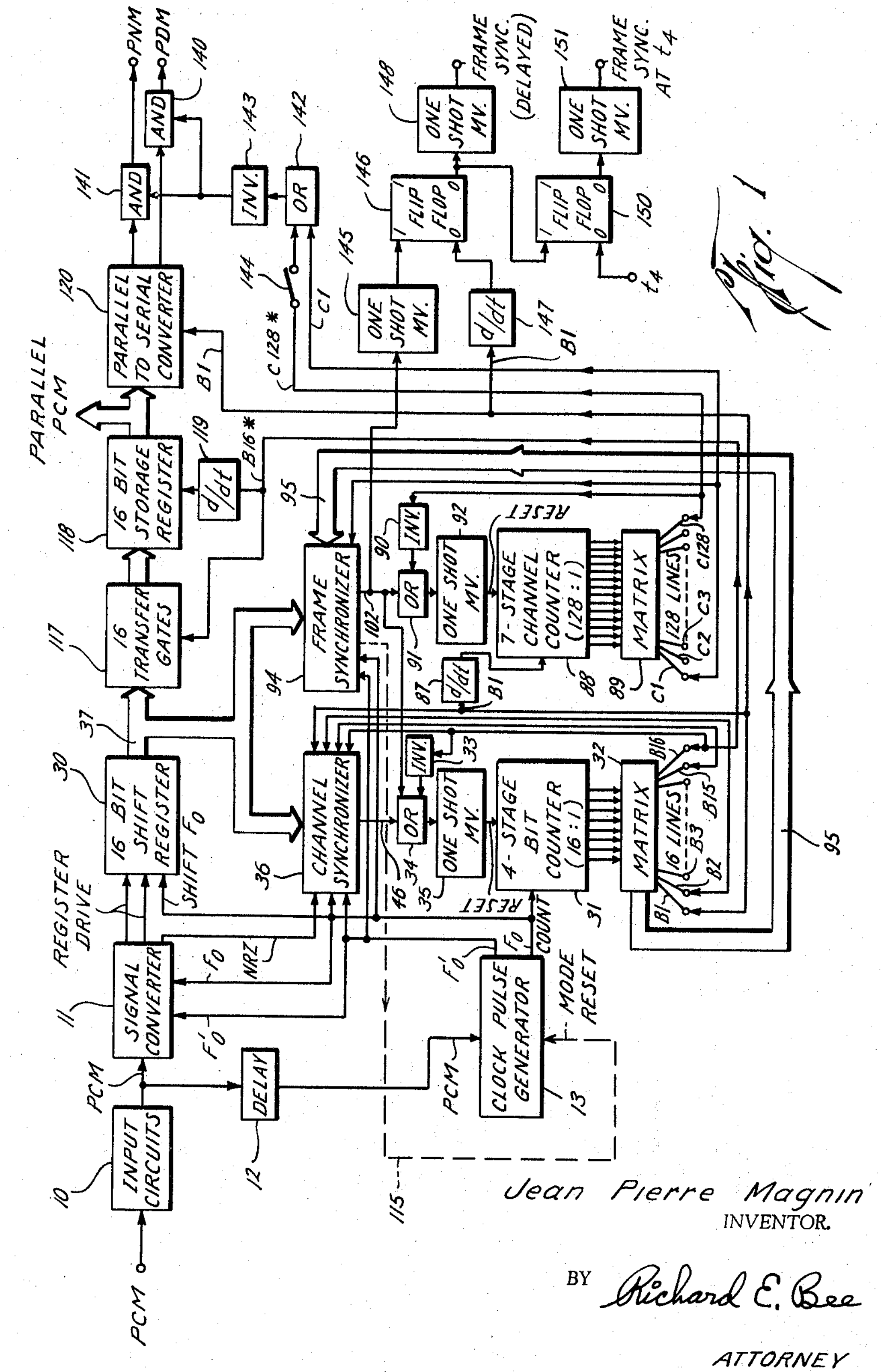
FIG. 1 is a block diagram of a representative embodiment of a telemetering signal processing system constructed in accordance with the present invention.

Referring now to FIG. 1 of the drawing, there is shown a general block diagram of a representative embodiment of a telemetering signal processing system constructed in accordance with the present invention. A primary function of this illustrated embodiment is to take an incoming pulse code modulated (PCM) signal and convert it to a pulse duration modulated (PDM) signal. The incoming pulse code signal is of the serial type wherein a succession of plural-bit pulse groups represents the data values obtained from a number of different data sources, one after the other in sequence. Each pulse group is referred to as a "signal channel" and each group represents, by means of a binary code pattern, a single data value from a single data source. After each data source has been sampled a first time, this process is repeated over and over again so that all the data sources are continually being sampled at periodic intervals to provide periodic contributions to the pulse code signal. Each complete cycle wherein each data source is sampled one time is referred to as a "frame."

The signal processing system of FIG. 1 is constructed to operate with a variety of different pulse code signals having different bit rates, different numbers of bits per channel and different numbers of channels per frame.

The bit rate, for example, may be anywhere from 45 per second to 80,000 per second. The number of bits per channel may be anywhere from 5 to 16 in number, while the number of channels per frame may be anywhere from 10 to 128 in number. Also, synchronizing pulses or signal patterns may be inserted into the incoming pulse train in a variety of different ways and the FIG. 1 system is constructed to accommodate these different synchronizing patterns. In particular, anywhere from zero to two bits in each channel may be used for synchronization purposes and these sync bits may be any chosen ones of the bit intervals in the channel. Also, all or any part of one channel may be used for frame synchronization purposes.

Figure 2A:
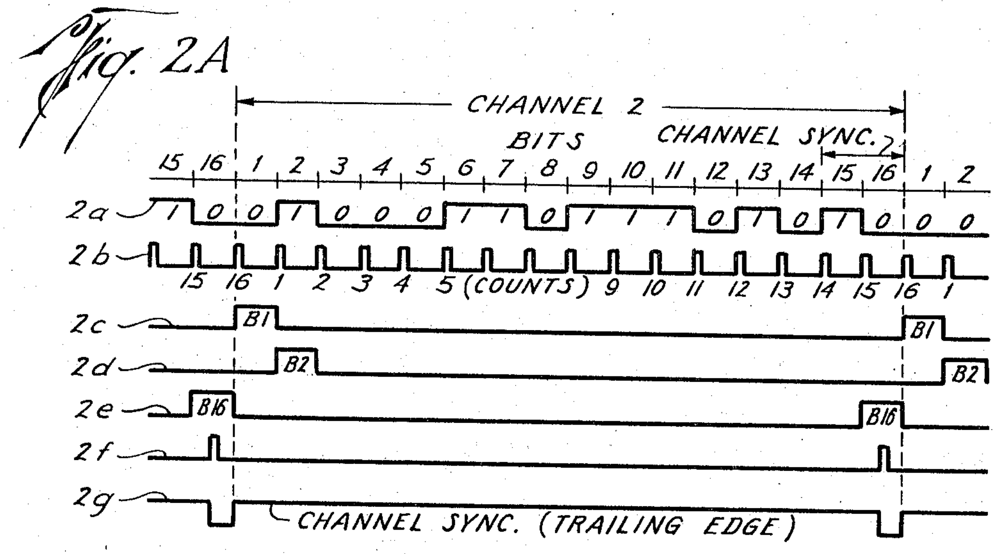
FIGS. 2A–2C are timing diagrams used in explaining the operation of the FIG. 1 system.
Figure 2B:
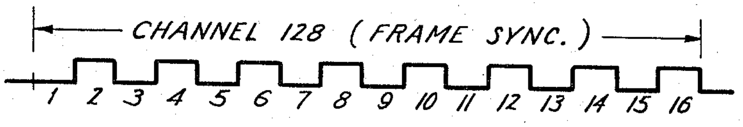
Figure 2C:
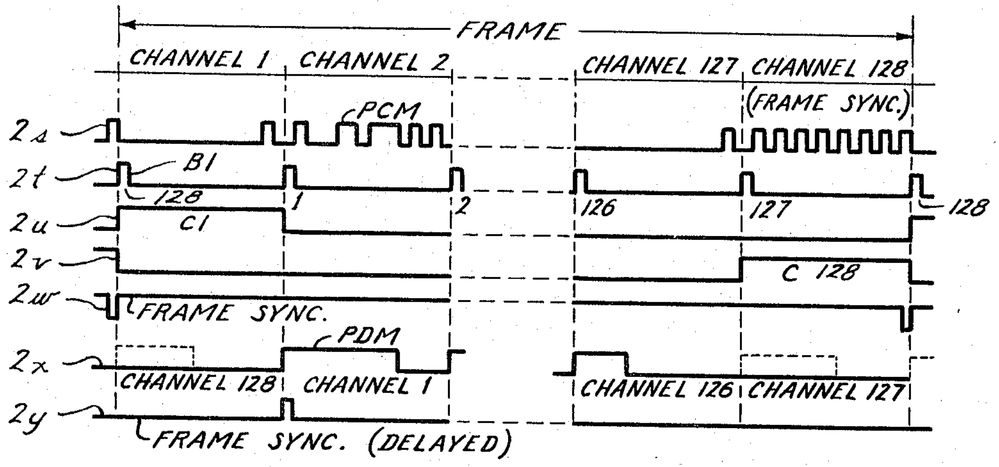

For purposes of explaining the invention, a particular set of parameters for the incoming pulse code signal will be assumed. These assumed parameters are indicated on the timing diagrams of FIGS. 2A–2C. As indicated in FIG. 2A, each channel interval is assumed to have 16 bit intervals. Waveform 2*a* represents an NRZ-type of incoming pulse code signal and, as indicated thereby, each of the individual bit intervals will contain either a "zero" level or a "one" level indication, depending on the data value being conveyed. Also, the last two bit intervals of each channel, namely, bits 15 and 16, are used for channel synchronization purposes and the assumed chanel sync pattern is a "one" value bit 15 and a "zero" value during bit 16. As indicated in FIG. 2C, it is assumed that 128 successive channels are required to constitute a frame interval. It is also assumed that the last channel, namely, channel 128, is used for frame synchronization purposes. The assumed frame synchronization pattern is shown on an expanded scale in FIG. 2B. It is composed of alternate "zero" and "one" values during the 16 bits of channel 128. Waveform 2*s* of FIG. 2C represents a typical pulse code signal (NRZ type) for an entire frame interval.

The incoming pulse code signal which is supplied to the FIG. 1 system is supplied first to input circuits 10. These input circuits 10 preferably include suitable amplifier, filter and regenerating or reshaping circuits for enhancing the appearance of the pulse code signal and for removing as much undesired noise fluctuation therefrom as is possible. After passage through the input circuits 10, the pulse code signal is supplied to a signal converter 11 and by way of a delay circuit 12 to a clock pulse generator 13. Delay circuit 12 provides a small time delay on the order of one microsecond or less. It may be omitted if the circuits in signal converter 11 are sufficiently fast or if a slight delay occurs in the clock pulse generator 13. Clock pulse generator 13 is a free-running type of generator which is continuously generating narrow bit-rate timing pulses. It includes suitable circuits for comparing the timing of these timing pulses with the incoming pulse code signal and making any necessary adjustments therein so that these timing pulses will be accurately in step with the bit intervals in the pulse code signal. A first set of these timing pulses, designated as $F_0$ pulses, occur at the boundary lines between adjacent bit intervals, while a second set of these timing pulses, designated as $F_0'$ pulses, occur midway during the bit intervals. More precisely, it is the leading edges of these pulses which occur at the designated places. These $F_0$ and $F_0'$ timing pulses are supplied to the signal converter 11 to control the converting action therein.

Clock pulse generator 13 may be constructed in a manner which is described in greater detail in applicant's copending application Ser. No. 165,100, now Patent No. 3,261,001 entitled Telemetering Decoder System and filed Jan. 9, 1962. Where a relatively wide range of bit rates is to be accommodated, then the clock pulse generator 13 may instead be constructed in the manner described in greater detail in applicant's co-pending application Ser. No. 166,538, now Patent No. 3,249,879 entitled Synchronous Signal Generator and filed Jan. 16, 1962.

Figure 3:
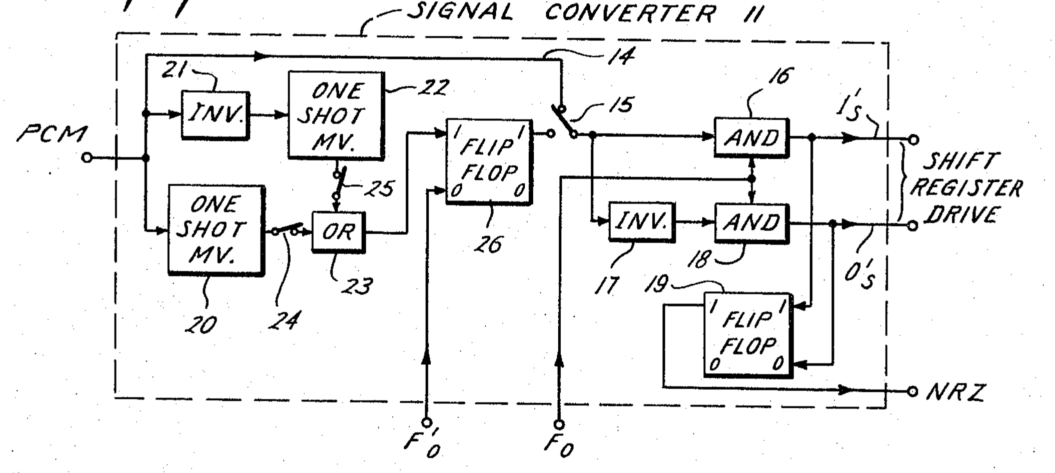
FIG. 3 is a block diagram showing the details of a signal converter used in the FIG. 1 system.
Figure 4:
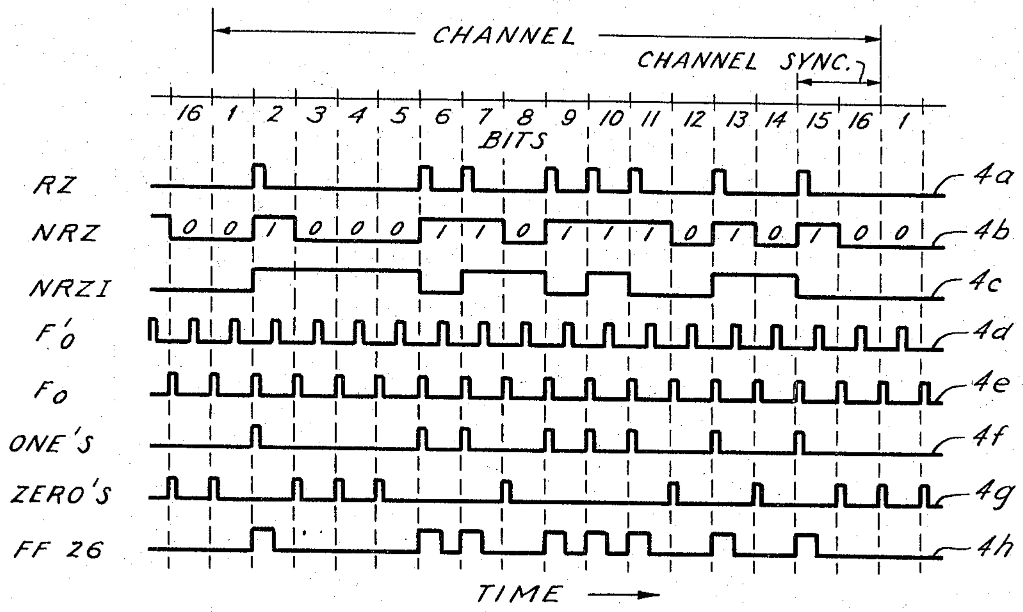
FIG. 4 is a timing diagram for the signal converter of FIG. 3.

Referring now to FIG. 3 of the drawings, there is shown the details of the signal converter 11. The PCM signal supplied to the input side thereof may be of any of the RZ, NRZ or NRZI types. These types are represented, respectively, by waveforms 4*a*, 4*b* and 4*c* of FIG. 4. For the first two types, a binary "one" level indication is present during any bit interval that should contain a binary "one" value. For the NRZI type, however, the signal transitions, either positive-going or negative-going are the important factors. A signal transition of either polarity indicates that the following bit interval contains a "one" value. These transitions are actually "impulses" and, in this respect, the NRZI "impulses" correspond to the pulses of the RZ signal.

For the case of an NRZ type input, the PCM signal is supplied by way of a conductor 14 and a switch 15 to an AND circuit 16 and an inverter circuit 17. The output of inverter 17, which is a polarity-inverted replica of its input, drives a second AND circuit 18. Either one or the other, but not both, of AND circuits 16 and 18 will be in an active condition at any given moment, depending on whether the incoming NRZ signal is at the "one" level or the "zero" level. If it is at the "one" level, then AND circuit 16 is in an active condition and, conversely, if it is at a "zero" level, then the second AND circuit 18 is in an active condition. $F_0$ timing pulses from the clock pulse generator 13 (waveform 4*e*) are supplied to each of the AND circuits 16 and 18. Each of these $F_0$ pulses will be passed by one or the other of AND circuits 16 and 18 depending on which of these circuits is in an active condition at the moment of occurrence of the $F_0$ pulse. In this regard, delay circuit 12 (FIG. 1) is used, where necessary, to insure that the leading edge of each $F_0$ pulse occurs at or after, but not before, the leading edge of the corresponding pulse code bit interval. Consequently, a relatively narrow pulse, corresponding to the $F_0$ pulse, will appear at the output of AND circuit 16 for each bit interval containing a "one" value. These "one" pulses are represented by waveform 4*f*. The zero-indicating pulses occurring at the output of AND circuit 18 during the zero-value bit intervals are indicated by waveform 4*g*. These "one" and "zero" indicating pulses are used to drive a shift register. They are also supplied to the "one" and "zero" input sides, respectively, of a flip-flop circuit 19 so as to regenerate the NRZ waveform.

For the case of either an RZ or an NRZI type of input, switch 15 is set to its lower position. Assuming first an NRZI type, then the incoming pulse code signal is supplied to a one-shot multivibrator 20 and an inverter circuit 21. One-shot multivibrator 20 is triggered by the positive-going transitions in the NRZI signal to produce relatively narrow output pulses corresponding thereto. The positive-going transitions in the inverted waveform appearing at the output of inverter 21 (negative-going transitions in the original signal) are used to trigger a second one-shot multivibrator 22. The output of the first multivibrator 20 is supplied to an OR circuit 23 by way of a now-closed switch 24. Similarly, the output of the second multivibrator 22 is supplied to the OR circuit 23 by way of a second now-closed switch 25. Thus, at the output of OR circuit 23 there appears a relatively narrow output pulse for each transition in the incoming NRZI type signal. These output pulses are used to set a flip-flop circuit 26 to the "one" state. One-half of a bit interval after it is set to the "one" state, the flip-flop 26 is returned to the "zero" state by an $F_0'$ timing pulse (waveform 4*d*) from the clock pulse generator 13. This produces an RZ version of the incoming PCM signal at the "one" side output of flip-flop 26. This RZ signal is represented by waveform 4*h*. It is supplied by way of the switch 15, which is now connected to the flip-flop 26, to the AND circuits 16 and 18 to gate such AND circuits in the same manner as for the first-considered NRZ signal.

For an RZ type of input signal, switch 25 is set to an open position so that only pulses from one-shot multivibrator 20 are supplied to the OR circuit 23. Consequently, pulses occur at the output of OR circuit 23 only for the positive-going leading edges of the RZ pulses. These pulses set the flip-flop 26 to the "one" state, this flip-flop in each case being returned to the "zero" state one-half of a bit interval later by an $F_0'$ timing pulse. This again will generate at the one side output of flip-flop 26 the RZ type of signal represented by waveform *4h*. These RZ pulses differ from the original RZ pulses in that they are of longer duration, occupying one-half of the bit interval. As before, these pulses are supplied by way of the switch 15 to gate the AND circuits 16 and 18 to produce the desired shift register drive.

It is seen from the foregoing that the same kind of shift register drive is produced regardless of whether the incoming pulse code signal is of the RZ, NRZ or NRZI type. Also, for any of these cases, an NRZ type of output signal will be produced at the output of flip-flop 19.

Returning now to FIG. 1 of the drawings, the "one" and "zero" indicating pulses from the signal converter 11, which are spaced apart in time, are supplied to the first stage of a 16-bit or 16-stage shift register 30 so as, individually, to drive this input register stage to the corresponding binary state. $F_0$ timing pulses from the clock pulse generator 13 are also supplied to the shift line of the shift register 30 for shifting the signal values from one stage to the next within the shift register 30. More particularly, at the same moment that a shift register drive pulse appears at the output of signal converter 11, the binary value previously stored in the first register stage is shifted to the second register stage, the binary value previously stored in the second register stage is shifted to the third register stage, and so on. Thus, the incoming pulse code signal progresses down the length of the shift register 30, stage by stage, so that at the end of 16 bit intervals the 16 stages of shift register 30 will be set to binary states corresponding to the 16 bit intervals of a PCM signal channel.

In order to process the individual signal channels in the pulse code signal, it is necessary to know exactly when each particular signal channel just fills the shift register 30. This is done by generating various bit-indicating and frame-indicating timing pulses. To this end, the $F_0$ timing pulses from clock pulse generator 13 are also supplied to a four-stage bit counter 31. These $F_0$ pulses are represented waveform *2b* of FIG. 2A. Counter 31 serves to count these pulses. For the assumed case of 16 bits per channel interval, 16 $F_0$ pulses are required to drive the counter 31 through a complete counting cycle. Coupled to the counter 31 is a matrix 32 for providing output signals which indicate how many counts has been counted by the counter 31. In particular, the matrix 32 has 16 output lines designated B1, B2, B3, etc. Output line B1 is energized when the counter 31 is in its initial or "zero" condition, output line B2 is energized after the first $F_0$ pulse is counted, output line B3 is energized after the second $F_0$ pulse is counted, etc. If the counter 31 is counting in step with the incoming pulse code signal, then whichever of the output lines from matrix 32 is energized will give an indication of which pulse code bit interval is contained in the first stage of the shift register 30. Typical bit-indicating output pulses produced on various ones of the 16 output lines from matrix 32 are indicated by waveforms *2c–2e* of FIG. 2A.

The last one of these bit-indicating output pulses is used to re-cycle the four-stage counter 31. In the present case, this last bit pulse is the B16 pulse (for bit interval 16) and this pulse is supplied by way of an inverter circuit 33 and an OR circuit 34 to a one-shot multivibrator 35. One-shot multivibrator 35 responds to a positive-going signal transition to generate a reset pulse for the counter 31. Because of the inverting action provided by the inverter 33, this reset pulse is triggered by the trailing edge of the B16 bit pulses. This reset pulse resets the four-stage bit counter 31 to its initial or zero condition. Since a four-stage counter would have returned to the zero condition at the end of 16 counts anyway, this recycling or resetting is not very important for this particular case. It is, however, quite important for pulse code signals having less than 16 bits per channel interval. For example, if there were 10 bits per channel interval, then the input of inverter 33 would be connected to the B10 matrix line and the one-shot multivibrator 35 would be triggered by the trailing edge of the B10 bit pulse to reset the counter 31 to a zero condition. Thus, the combination of counter 31, matrix 32 and the associated reset circuits form an adjustable or variable capacity pulse counter, the adjustment being made by connecting the appropriate matrix output line to the reset circuits.

In order to cause the four-stage counter 31 to start in a zero condition at the same time that the first bit of each signal channel is in the first stage of the shift register 30, a channel synchronizer 36 is provided. This channel synchronizer serves to detect the occurrence of the channel synchronizing patterns in the pulse code signal and, in response thereto, to generate appropriate reset signals which are supplied by way of OR circuit 34 to the one-shot multivibrator 35 so as to set the four-stage counter 31 to the zero condition at the appropriate moments.

Figure 5:
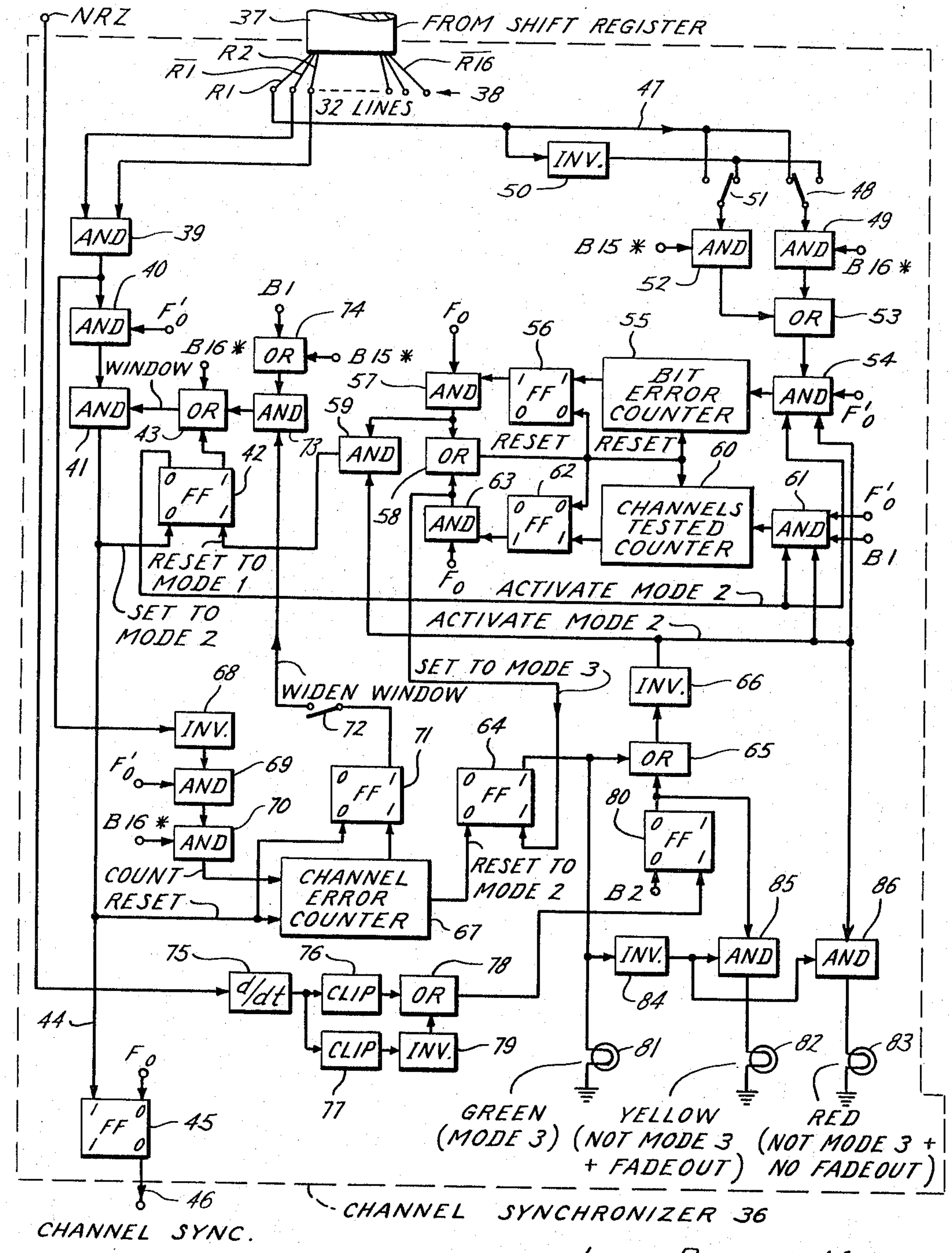
FIG. 5 is a block diagram showing the details of a channel synchronizer which is used in the FIG. 1 system.

The details of channel synchronizer 36 are shown in FIG. 5. It is similar to the word synchronizer described in the abovementioned co-pending application Ser. No. 165,100. It is provided with three distinct operating modes which come into operation one at a time, in sequence, as the degree of synchronization with the incoming pulse code signal increases. The first of these modes, designated Mode 1, prevails when the synchronizer 36 is in a completely unsynchronized condition. In Mode 1, the synchronizer 36 operates to detect the first-occurring pulse pattern which looks like a correct channel sync pattern and thereupon to generate a reset signal for the counter 31 and, at the same time, to shift itself into Mode 2. In Mode 2, the synchronizer 36 checks the periodicity of the sync bits detected in Mode 1 by checking to see if correct synchronizing pulse patterns are repeated at corresponding bit intervals one, two and three channel intervals later. If they are, to within a predetermined degree of accuracy, then the synchronizer 36 shifts to Mode 3, otherwise it shifts back to Mode 1 and starts all over again with the next pulse pattern that looks like a channel sync pattern. When it reaches Mode 3, the synchronizer 36 remains therein so long as correct synchronization continues to prevail. More particularly, it will remain in Mode 3 until a predetermined number of consecutive channels have occurred without having detected a correct synchronizing pulse pattern. If the synchronizer 36 is thrown out of Mode 3, then it returns to Mode 2 and, if necessary, to Mode 1. Since the transition from Mode 2 to Mode 3 indicates, to a high degree of probability, that correct synchronization has been established, the Mode 3 mechanism is constructed so that a relatively severe synchronization failure must occur before the synchronizer 36 is set back to Mode 2.

In order to examine the contents of the shift register 30, a multiconductor cable 37 carries a pair of lines from each of the 16 shift register stages to the channel synchronizer 36. One line of each pair is connected to the "one" side and the other line of each pair is connected to the "zero" side (complement side) of the corresponding shift register stage. As shown in FIG. 5, these lines from the shift register 30 are individually connected to different ones of a set of 32 selector contacts 38 in the synchronizer 36. Appropriate ones of these selector contacts 38 are connected to an AND circuit 39. Which contacts are so connected depends on the locations and binary signal values of the channel synchronizing bits in the pulse code signal. In the present example, where bits 15 and 16 are the sync bits and the correct sync pattern is a "one" level during bit 15 and a "zero" level indication during bit 16, then the "zero" or complement side of the first shift register stage (line $\overline{R1}$) and the "one" side of the second shift register stage (line R2) are coupled to the AND circuit 39. These register lines were chosen on the basis of the shift register conditions which should occur whenever a complete channel interval just fills the shift register 30. (Note that bit 16 will be in the first or R1 stage, while bit 1, on the other hand, will be in the last or R16 stage.) For the assumed connections, AND circuit 39 will be activated with two "one" level inputs and, thus, will produce a "one" level output whenever the second shift register stage is in the "one" state and the first shift register stage is in the "zero" state.

The "one" level output from AND circuit 39 is applied to a second AND circuit 40 to enable the passage of one of the $F_0'$ timing pulses supplied to the second input thereof. This selected $F_0'$ timing pulse is then passed by a third AND circuit 41, provided the second input to such AND circuit is also activated. During the initial Mode 1 operation, the second input of AND circuit 41 is held in an activated condition by a flip-flop circuit 42 which is coupled thereto by way of an OR circuit 43. Flip-flop 42 is a mode control flip-flop which is in a "one" state whenever Mode 1 prevails. Thus, in Mode 1 the first "one"-"zero" pattern which occurs in the second and first register stages is assumed to be the desired channel sync pattern and results in the passage of an $F_0'$ timing pulse through AND circuits 40 and 41 to a sync pulse output line 44.

Assuming that this was a correct channel sync pattern, then this pulse on output line 44 is represented by one of the pulses of waveform 2*f* of FIG. 2A. It will have occurred at the midway point in bit interval 16. It is used to set an output flip-flop circuit 45 to a "one" state. $F_0$ timing pulses are supplied to the "zero" side input of flip-flop 45. The next occurring $F_0$ timing pulse (one-half of a bit interval later) serves to return the flip-flop 45 to the "zero" state. The resulting waveform produced at the "zero" side output of flip-flop 45 is indicated by waveform 2*g* of FIG. 2A. As there indicated, the positive-going transition which occurs when the flip-flop 45 returns to the "zero" state is exactly in step with the boundary line between two adjacent signal channels. Consequently, this positive-going transition is supplied by way of an output line 46 and the OR circuit 34 (FIG. 1) to the one-shot multivibrator 35 which resets the four-stage bit counter 31 to its initial or zero condition. This reset starts the four-stage counter 31 in step with the next channel in the pulse code signal. As a consequence, the bit timing pulses B1, B2, B3, etc., produced by matrix 32 will occur at the same time that the corresponding bits in the pulse code signal are in the first (R1) stage of the shift register 30.

The passage of an $F_0'$ pulse to the output line 44 (FIG. 5) also serves to set the channel synchronizer 36 to the Mode 2 operation. This occurs because this $F_0'$ pulse is also supplied to the "zero" side input of mode control flip-flop 42. With the flip-flop 42 in the "zero" state, the continuously-activating "one" level signal is no longer applied to the second input of AND circuit 41. Instead, the AND circuit 41 will be periodically energized, once each channel, by the B16 bit timing pulse supplied to the second input of OR circuit 43. Since bit 16 is the expected time of occurrence of subsequent channel sync indications at the input of AND circuit 39, $F_0'$ timing pulses will continue to be supplied to the output line 44 at the correct time if, in fact, the B16 pulse from matrix 32 is actually occurring during bit interval 16 of the pulse code signal.

The asterisk symbol (*) attached to the B16 designation for the second input of OR circuit 43 indicates that this input must be coupled to a different bit timing line of the matrix 32 if the pulse code signal contains other than 16 bits per channel. If, for example, the pulse code signal contained 10 bits per channel, then this second input of OR circuit 43 would be connected to the B10 output line of matrix 32. In other words, this input is connected to the bit timing line corresponding to the last bit in each channel.

With the Mode 2 operation established, the channel synchronizer 36 then operates to examine subsequent signal channels in the incoming pulse code signal to determine whether the apparent synchronizing bits recognized in Mode 1 were, in fact, the true sync bits of the pulse code signal. To this end, the "one" side of the first shift register stage (line R1) is coupled by way of a conductor 47 and a switch 48 to an AND circuit 49. B16 bit timing pulses are supplied to a second input of AND circuit 49. The shift register line R1 is also coupled by way of an inverter circuit 50 and a switch 51 to an AND circuit 52. B15 bit timing pulses are supplied to a second input of AND circuit 52. AND circuits 49 and 52 are activated at their respective times by the B16 and B15 timing pulses to examine the signal bits existing at these times in the first stage of shift register 30. If a correct "one" level signal occurs during the B15 timing interval, then the AND circuit 52, which is activated during this bit interval, does not produce an output pulse because the inverter circuit 50 places one of the inputs thereof at the "zero" level. If, on the other hand, the signal level is an erroneous "zero" value, this "zero" value is inverted to produce a "one" level at the input of AND circuit 52 and such circuit will accordingly produce an output "one" level during the B15 timing interval. This error-indicating output from AND circuit 52 is supplied to an OR circuit 53. During the B16 timing interval, if the pulse code signal in the first shift register stage has the desired "zero" level, then no output is produced at the output of AND circuit 49. If the pulse code signal is, instead, at the incorrect "one" level, however, AND circuit 49 will produce a "one" level output. This error indication for bit 16 is also supplied to the OR circuit 53. OR circuit 53 supplies these bit-length error indications to an AND circuit 54. AND circuit 54 will thus pass $F_0'$ timing pulses during either or both of the B15 and B16 timing intervals if the pulse code signal does not have the correct sync pattern values during either or both of these intervals. These selected $F_0'$ pulses thus indicate the occurrence of erroneous sync bits. A large number of such errors usually idicates that the B15 and B16 timing pulses are not truly in step with bits 15 and 16 of the pulse code signal. A small number of errors, on the other hand, is more likely to have resulted from noise impairment of the incoming pulse code signal.

If other than the assumed pulse code signal is received and if the sync bits are at different bit locations in the signal or if the signal has a different number of bits per channel, then the particular bit timing signal supplied to AND circuits 49 and 52 must be changed accordingly. Also, if the respective sync bits which are to be analyzed by AND circuits 49 and 52 are of the opposite binary value, then switches 48 and 51 are set to the other of their two positions.

The error-indicating $F_0'$ pulses which are passed by AND circuit 54 are counted by a bit error counter 55. When the bit error counter 55 has counted a predetermined number of these error-indicating pulses, it produces an output signal transition which sets a flip-flop circuit 56 to the "one" state. This, in turn, activates an AND circuit 57 which passes the next occurring $F_0$ timing pulse supplied to a second input thereof. This selected $F_0$ pulse is passed by an OR circuit 58 and supplied back to the counter 55 and flip-flop 56 to reset both of these circuits to their zero conditions. This selected $F_0$ pulse is also supplied to a Mode 2 output AND circuit 59.

At the same time that the bit error counter 55 is counting error-indicating pulses, a second counter, namely, a "channels tested" counter 60, is keeping track of the number of channels that have been analyzed by the AND circuits 49 and 52. To this end, both $F_0'$ and B1 timing pulses are supplied to an AND circuit 61. Thus, during the first bit of each channel and $F_0'$ timing pulse is passed to the counter 60. In this manner, counter 60 counts one count for each occurrence of a signal channel. After a predetermined number of counts, counter 60 produces an output transition which sets a flip-flop 62 to the "one" state. This activates an AND circuit 63 which then passes the next occurring $F_0$ timing pulse. This selected $F_0$ pulse is supplied by way of OR circuit 58 back to the counter 60 and flip-flop 62 to reset these circuits to their zero conditions. This selected $F_0$ pulse also resets the first counter 55 and its flip-flop 56 to a zero condition. Conversely, any $F_0$ timing pulse selected by the first counter 55 in its AND circuit 57 will likewise reset the second counter 60 and its flip flop 62 to the zero condition.

With each of counters 55 and 60 in their initial or zero conditions, counter 55 commences counting errors in the apparent sync bits established in Mode 1, while counter 60 commences counting the number of channels that have been examined. The input-output counting ratios of counters 55 and 60 are proportioned in a manner determined by the error rate that is to be expected as a result of the prevailing signal-to-noise ratio for the incoming pulse code signal. This enables the synchronizer 36 to distinguish between noise errors and improper sync errors. Counter 55, for example, may be set to have a 3:1 counting ratio, while counter 60 may be set to have a 4:1 counting ratio. This enables counter 55 to count two errors before it produces an output pulse and enables three channel intervals to be examined before the counter 60 produces an output pulse. Thus, if, during the occurrence of the first three channel intervals after Mode 2 is reached, less than three sync bit errors are counted, then the counter 60 will be the first to produce an output pulse. If this happens, then the subsequent $F_0$ timing pulse selected by the AND circuit 63 will be used to set the channel synchronizer 36 to Mode 3. If, on the other hand, three or more bit sync errors are counted before the elapse of three channel intervals, the counter 55 will be the first to produce an output pulse. This output pulse sets flip-flop 56 to the "one" state and, thus, enables the AND circuit 57 to select an $F_0$ timing pulse which is passed to the AND circuit 59. AND circuit 59 is effective during Mode 2 to pass this selected $F_0$ timing pulse back to the mode control flip-flop 42 to return this flip-flop to the Mode 1 condition. Note that during Mode 1 the AND circuits 54 and 61 connected to the inputs of counters 55 and 60 are disabled by the presence of a "zero" level signal on the line running thereto from the "zero" side output of flip-flop 42.

When the counter 60 is the first to produce an output pulse, then, to a high degree of probability, the reset time selected for the four-stage bit counter 31 (FIG. 1) during the just previous Mode 1 operation was in fact the correct reset time. When counter 60 is the first to produce an output pulse, then an $F_0$ timing pulse is selected by the AND circuit 63 and appears at the output thereof. This selected $F_0$ pulse is supplied to the "one" side input of a mode control flip-flop circuit 64 to set this flip-flop 64 to the "one" state. This "one" state in flip-flop 64 establishes the existence of Mode 3. The corresponding "one" level at the "one" side output of mode control flip-flop 64 is supplied by way of an OR circuit 65 to an inverter 66. The consequent zero level at the output of inverter 66 serves to disable AND circuits 54, 61 and 59 associated with the Mode 2 counters 55 and 60, thus disabling any further Mode 2 action.

In Mode 3, the continued existence of correct channel synchronization is determined by a channel error counter 67. The counting input of this channel error counter 67 is coupled to the output of AND circuit 39 by way of an inverter circuit 68, an AND circuit 69 and an AND circuit 70. AND circuits 69 and 70 receive, respectively, $F_0'$ and B16 (last bit of channel if less than 16) timing pulses so as to enable the passage of an $F_0'$ timing pulse to the channel error counter 67 during bit interval 16 whenever the output of AND circuit 39 is, at this time, not indicating the occurrence of a correct channel sync pattern. Thus, one $F_0'$ pulse will be counted by the counter 67 for each channel in which a correct channel sync pattern is not recognized. Anytime a correct channel sync pattern is recognized, then the $F_0'$ timing pulse appearing on the sync output line 44 will be supplied to the channel error counter 67 to reset this counter to its initial or zero condition. The channel error counter 67 is constructed to have, for example, a 5:1 counting ratio. Thus, whenever five consecutive channels occur without the recognition of a correct channel sync pattern, the channel error counter 67 will produce an output signal transition which serves to set the mode control flip-flop 64 back to the "zero" state. This returns the channel synchronizer 36 to the Mode 2 condition.

In some cases it will be desirable to increase slightly the chances of detecting a correct channel sync pattern just before the synchronizer 36 leaves Mode 3 to return to Mode 2. To this end, a flip-flop circuit 71 is coupled to the channel error counter 67 so as to recognize the occurrence of an intermediate number of errors, for example, three errors. When this occurs, flip-flop 71 is set to a "one" state and the resulting "one" level output at the "one" side thereof is supplied by way of a switch 72 to an AND circuit 73. This activates AND circuit 73 and, hence, enables B1 and B15 (next to last bit of channel) timing pulses, which are supplied thereto by an OR circuit 74, to be passed on by way of the OR circuit 43 to the second input of AND circuit 41. This increases the active time of AND circuit 41 which, in turn, enables the detection of a correct channel sync pattern that had not shifted off from the B16 timing interval by more than one bit interval. This would correspond to the case of a small phase drift occurring after synchronization has once been obtained. If it is not desired to use this feature, then the switch 72 may be placed in its open position.

Another feature provided by the channel synchronizer 36 is that the synchronizer 36 will not immediately return to the Mode 2 operation if the loss of Mode 3 synchronization is caused by a fade-out or loss of the incoming pulse code signal. To this end, the incoming pulse code signal or, more particularly, the NRZ replica thereof which is generated in the signal converter 11 is supplied to the channel synchronizer 36 and, in particular, to a differentiating circuit 75 therein. The output of differentiating circuit 75 is supplied to a pair of clipping circuits 76 and 77, the first of which is constructed to pass positive-going pulses and the second of which is constructed to pass negative-going pulses. The pulses from clipping circuit 76 are supplied directly to an OR circuit 78 while the negative-going pulses from clipping circuit 77 are first inverted by an inverter 79 and then supplied to the OR circuit 78. As a consequence, there appears at the output of OR circuit 78 a train of positive-going pulses indicating the signal transitions (either polarity) in the NRZ signal. These pulses are supplied to a fade-out control flip-flop 80 to set it to its "one" state. The existence of flip-flop 80 in its "one" state indicates that there is no fade-out of the incoming pulse code signal. In this state, the "zero" level side output of flip-flop 80 will be at the "zero" level. This "zero" level is applied by way of OR circuit 65 and inverted by the inverter 66 so as to produce the necessary "one" level activation for the AND circuits 54, 59 and 61 associated with the Mode 2 counters 55 and 60, provided that the mode control flip-flop 64 is not in the "one" state, or, in other words, that the synchronizer 36 is not in Mode 3. Whenever flip-flop 64 is in the "one" state (Mode 3), the output of inverter 66 is always at the "zero" level.

In order to determine whether signal fade-out is occurring, the fade-out control flip-flop 80 is periodically reset to the "zero" state by a B2 bit timing pulse. If there is no signal fade-out, then this flip-flop will be returned to its "one" state fairly rapidly by a transition in the NRZ signal. If, on the other hand, there is signal fade-out, then the fade-out control flip-flop 80 remains in its "zero" state, in which case its "zero" side output will be at the "one" level. This affirmative "one" level is applied by way of OR circuit 65 to inverter 66 to place the output of inverter 66 at the "zero" level and to hold it at this level even though the mode control flip-flop 64 is indicating that the synchronizer 36 should return to Mode 2. Thus, the reactivation of the Mode 2 circuits is postponed so long as the signal fade-out condition prevails. Upon the return of the incoming pulse code signal the synchronizer 36 will immediately commence its Mode 2 operation.

Indicator lamps 81, 82 and 83 are provided to give a visual indication of the operating condition of the channel synchronizer 36. In particular, a green indicator lamp 81 is coupled to the output of mode control flip-flop 64 so as to be turned on whenever the synchronizer 36 is in Mode 3. The second indicator lamp 82 (a yellow lamp) is coupled by way of an inverter circuit 84 and an AND circuit 85 to the outputs of both the mode control flip-flop 64 and the fade-out control flip-flop 80 so as to give an indication whenever the synchronizer is not in Mode 3 and the reason is the occurrence of signal fade-out. The third indicator lamp 83 (a red lamp) is connected by way of the inverter circuit 84 and an AND circuit 86 to the outputs of the mode control flip-flop 64 and the inverter circuit 66 so as to be energized whenever the synchronizer 36 is not in Mode 3 and there is no signal fade-out.

The counting ratios of the Mode 2 counters 55 and 60 establish a maximum error rate which will be tolerated and still have the synchronizer 36 progress from Mode 2 to Mode 3. For maximum efficiency, this error rate should be selected to correspond to the prevailing signal-to-noise ratio for the incoming pulse code signal. If the signal processing apparatus of the present invention is to be used in different environments having different signal-to-noise ratios, then provision should be made for changing the maximum tolerable error rate accordingly. This is done by changing the counting ratios in either or both of the counters 55 and 60. Also, assuming the same error rate, then if the nature of the pulse code signal is changed so as to have a different number of synchronizing bits per channel, then one or both of the counting ratios should be adjusted to maintain the same error rate. For either of these reasons both of the counters 55 and 60 are preferably of the adjustable type. To this end, each of counters 55 and 60 includes a four-stage counter and a matrix circuit for recognizing the occurrence of any selected count within the total range (16:1) of the counter. A counter reset circuit is then provided which may be selectively connected to any one of the matrix output lines, depending on the desired counting ratio. In this manner, each of counters 55 and 60 can be set to provide a counting ratio of anywhere from 1:1 to 16:1.

The counting ratio for the Mode 3 channel error counter 67 is determined in accordance with the criterion that is established to denote the fact that synchronization has been lost. It should be able to accommodate momentary signal losses or momentary increases in noise level without throwing the synchronizer 36 back into Mode 2. In this regard, it is noted that once synchronization is established, then the free-running clock pulse generator 13 and the bit counter 31 connected thereto will continue to operate in a synchronized condition for an appreciable period of time after the incoming pulse code signal disappears or is impaired beyond recognition by noise. Signals having different bit rates or different numbers of bits per channel will, however, change the numerical value of the number of successive channels which should be allowed to elapse without the occurrence of a correct channel sync pattern. Consequently, the channel error counter 67 is also of the adjustable type. To this end, it includes a four-stage counter and matrix circuit, together with a reset connection that may be connected to any one of the matrix output lines.

Returning now to FIG. 1, it is seen that with the four-stage bit counter 31 counting in step with the corresponding bit intervals in the pulse code signal, the identity of each bit contained in the shift register 30 at any given moment is now known. It remains to determine the identity of the channel or channels which are in the shift register 30 at any given moment. To this end, the B1 bit timing pulses from matrix 32 are also supplied by way of a differentiating circuit 87 to the counting input of a seven-stage channel counter 88. These B1 pulses are represented by waveform 2*t* of FIG. 2C. The channel counter 88 is actuated by the leading edge of each of these B1 pulses to record a single count therein. A matrix circuit 98 is coupled to the various stages of the channel counter 88. This matrix circuit 89 is provided with 128 separate output lines, identified as C1, C2, C3, etc. When the channel counter 88 is properly synchronized with the pulse code signal, a "one" level pulse appears on the C1 output line of matrix 89 when the counter 88 is in its initial or zero-count condition, a "one" level output pulse appears on the C2 output line after the counter 88 has counted the first B1 pulse, a "one" level output pulse appears on the C2 output line the counter 88 has counted the second B1 pulse, etc. Consequently, when the channel counter 88 is properly synchronized with the pulse code signal, the matrix 89 output pulse C1 prevails for the duration of channel 1 in the pulse code signal, the output pulse on line C2 prevails for the duration of channel 2, the output pulse on line C3 prevails for the duration of channel 3, etc. Typical ones of these channel timing pulses are indicated by waveforms 2*u* and 2*v* of FIG. 2C.

In order to re-cycle the seven-stage channel counter 88, the channel timing pulse from matrix 89 which corresponds to the last channel in the frame is supplied by way of an inverter circuit 90 and an OR circuit 91 to a one-shot multivibrator 92. Multivibrator 92 is triggered by positive-going signal transitions to generate a reset pulse which is supplied to the counter 88 to reset it to its initial or zero condition. Because of the polarity-inverting action provided by inverter 90, this triggering coincides with the trailing edge of the channel timing pulse which is supplied to the inverter 90. For the present case, channel timing pulse C128 is the last pulse in the frame and is the one supplied to inverter 90. As represented by waveform 2*v*, the trailing edge thereof coincides with the boundary line between the end of one frame and the beginning of the next frame. If the incoming pulse code signal as less than 128 channels per frame, then a different one of the matrix 89 output lines is used to supply the input signal to the inverter circuit 90. For example, if there are only 60 channels per frame, then the input of inverter 90 is, in this case, connected to the C60 output line of matrix 89. Thus, channel counter 88, matrix 89 and the associated reset circuits represent an adjustable capacity pulse counter.

A frame synchronizer 94 is used to synchronize the resettings of the seven-stage channel counter 88 with the incoming pulse code signal so that the counter 88 will start in the zero condition just as channel 1 in the pulse code signal starts to enter the shift register 30. In order to provide this synchronizing action, the multiconductor cable 37 from the shift register 30 is coupled to the frame synchronizer 94 so as to make available therein indications of the signal conditions in the various stages of shift register 30. Frame synchronizer 94 also requires the use of all of the bit timing pulses B1–B16 generated by the matrix 32. Consequently, all 16 output lines of matrix 32 are contained in a multiconductor cable 95 which extends from such matrix 32 to the frame synchronizer 94.

Figure 6:
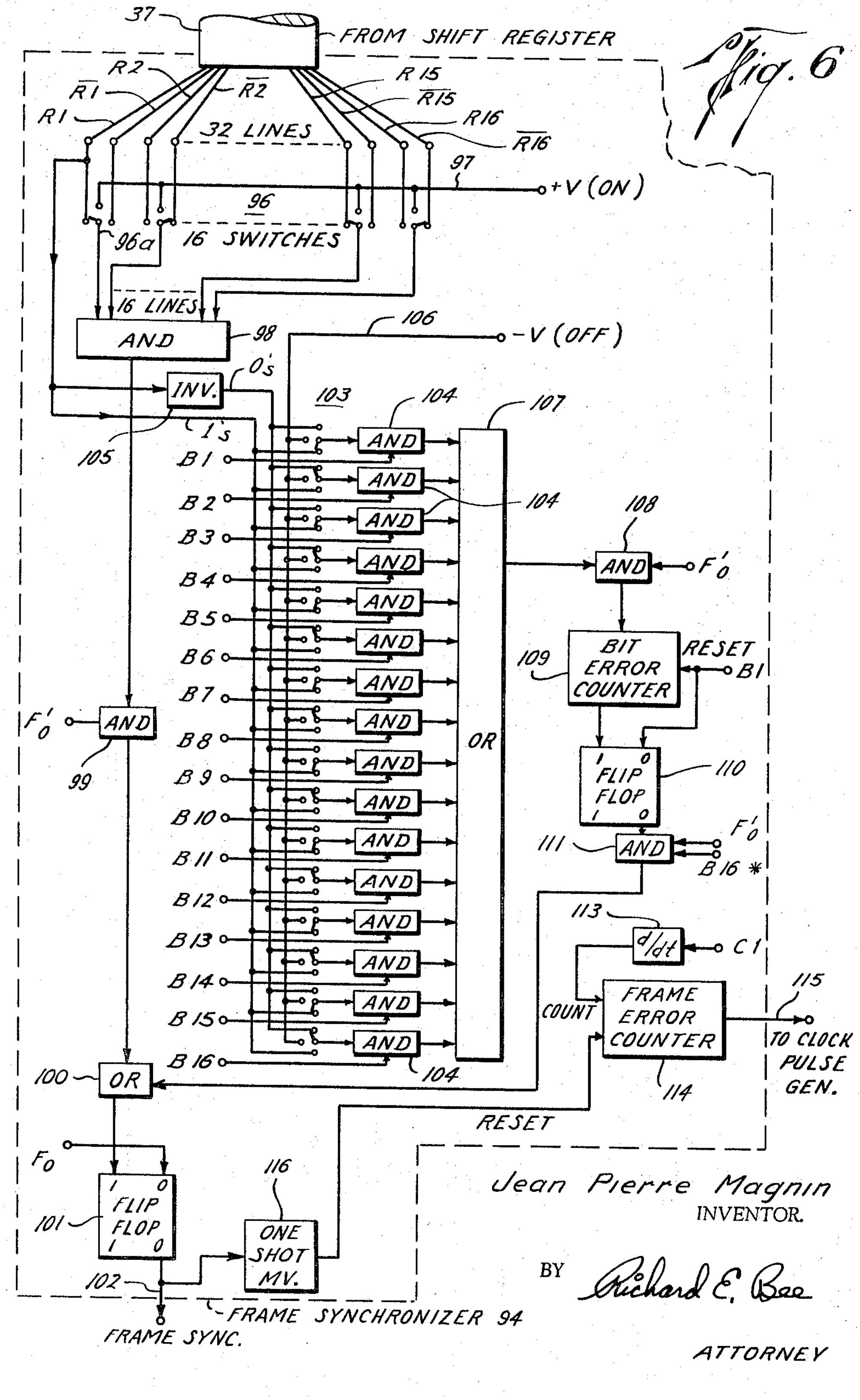
FIG. 6 is a detailed block diagram of a frame synchronizer used in the FIG. 1 system.

The details of frame synchronizer 94 are shown in FIG. 6 of the drawings. As will be seen, this frame synchronizer 94 has two distinct operating mechanisms or circuit portions which operate in parallel with one another to generate the necessary synchronizing signals for the channel counter 88. As seen in FIG. 6, the shift register lines coming to the frame synchronizer 94 by way of the multi-conductor cable 37 are connected to a set of 16 code selector switches 96. Each of these switches is a single-pole, three-position switch. The two lines from any given register stage are connected to different contacts of the same switch. For the first switch 96a, for example, the R1 line from the first register stage is connected to a first of the fixed contacts, while the $\overline{R1}$ complement line from the first register stage is connected to a third contact of this switch 96a. A second or intermediate contact of this switch 96a is connected to a source of positive bias voltage +v. by way of a supply line 97.

The 16 code selector switches 96 are set to a pattern corresponding to the frame synchronizing pattern in the pulse code signal. For the assumed frame sync pattern shown in FIG. 2B, the first of switches 96 is set to the "one"-indicating R1 line in accordance with the "one" level of bit 16 of the frame sync pattern, the second of switches 96 is set to the "zero"-indicating $\overline{R2}$ line to correspond with the "zero" level of bit 15 of the frame sync pattern, the third of switches 96 is set to the "one"-indicating R3 line to correspond to the "one" level of bit 14, the fourth of switches 96 is set to the "zero"-indicating $\overline{R4}$ line to correspond with bit 13, etc. The pulse code bit intervals are considered in reverse order because, when the frame sync pattern just fills the shift register 30, bit 16 thereof will be in the first register stage, while bit 1 thereof will be in the last (R16) register stage. If the pulse code frame sync pattern should contain less than 16 bits, then the switches corresponding to the missing or unused bits should be connected to their intermediate contacts which are connected to the bias voltage line 97.

The 16 movable arms of the switches 96 are connected to a 16-input AND circuit 98. This AND circuit 98 will produce a "one" level output indication whenever all 16 inputs thereto are at the "one" level. Thus, with the proper switch settings, AND circuit 98 will produce a "one" level output indication whenever the 16 stages in the shift register 30 contain a pulse pattern which corresponds to a correct frame sync pattern. This "one" level output indication is supplied to a first input of an AND circuit 99 to place this circuit in an active condition. When in such condition, AND circuit 99 will pass an $F_0'$ timing pulse which is supplied to a second input thereof. Since the frame sync pattern just fills the shift register 30 only during the last bit (bit 16) of the last channel (channel 128), only the single $F_0'$ timing pulse corresponding to this bit and channel interval will be passed by the AND circuit 99. This selected $F_0'$ pulse is supplied by way of an OR circuit 100 to the "one" side input of flip-flop circuit 101. This pulse sets flip-flop 101 to the "one" state. The next occurring $F_0$ timing pulse supplied to the zero side of flip-flop 101 (one-half a bit interval later) serves to return the flip-flop 101 to the "zero" state. This cycle of operation causes the flip-flop 101 to produce a negative-going output pulse on the frame sync output line 102. Typical ones of these frame sync pulses are indicated by waveform 2w of FIG. 2C. The positive-going trailing edge of each of these pulses serves as the channel counter reset signal and, to this end, is supplied by way of OR circuit 91 (FIG. 1) to trigger the one-shot multivibrator 92 and thus reset the seven-stage channel counter 88 to its initial or zero-count condition. As indicated by waveform 2w, this positive-going reset transition occurs at the boundary line between the end of one frame and the beginning of the next frame.

The circuits considered up to this point for the frame synchronizer 94 serve to provide one of the frame synchronizing mechanisms. In particular, this mechanism will produce a desired frame sync output signal whenever a completely correct frame synchronizing pattern just fills the shift register 30. If there is any appreciable noise impairment of the incoming pulse code signal, then it is likely that many of the frame sync channels in the incoming pulse code signal will not have a completely correct frame synchronizing pattern. One or more of the bits in the frame sync pattern is likely to have an incorrect binary value because of erroneous indications caused by such undesired electrical noise. Consequently, the frame synchronizer 94 is provided with a second synchronizing mechanism which is capable of recognizing the occurrence of an almost, but not completely, correct frame synchronizing pattern. To this end, the frame synchronizer 94 includes a second set of frame code selector switches 103 and a set of 16 AND circuits 104. These AND circuits 104 serve to examine the pulse code signal as it appears in the first (R1) register stage. Thus, the R1 register line is connected to a first of the three fixed contacts of each of the 16 switches 103. This R1 line is also connected by way of an inverter circuit 105 to the third fixed contact of each of the selector switches 103. The intermediate or second contact of each of the switches 103 is connected to a negative voltage line 106. This negative bias voltage is of sufficient amplitude to disable any of the AND circuits 104 should it be supplied thereto. Each of the AND circuits 104 is energized by one of the bit timing pulse lines B1, B2, B3, etc. Thus, the first of AND circuits 104 is energized by the B1 bit timing pulse to examine the contents of the first shift register stage during bit 1. The second of AND circuit 104 is energized during the occurrence of bit timing pulse B2 to examine the contents of the first shift register stage during the second bit interval. Similar considerations apply for the remainder of the AND circuits 104.

The output indications from AND circuits 104 are intended to represent the occurrence of erroneous frame sync bits in the pulse code signal. Thus, the first of AND circuits 104 will produce an output pulse if the pulse code signal is at the "one" level during the bit 1 interval. It should have been at the "zero" level for a correct frame sync pattern. The second of AND circuits 104 will produce an output pulse during the occurrence of the second bit interval if the pulse code signal is at the "zero" level during this interval, this "zero" level being inverted by inverter circuit 105 to provide a "one" level input for the second AND circuit 104. The second bit interval should have contained a "one" value, however, for a correct frame sync pattern. Similar considerations apply for the remainder of the AND circuits 104. It is thus seen that the selector switches 103 should be set to just the opposite of the desired frame sync pattern. If the frame sync pattern contains less than 16 bits, then the switches for the AND circuits 104 which correspond to the unused bits should be set to the second switch contacts so as to apply to these AND circuits the continuous disabling voltage −V appearing on line 106.

The error-indicating output signals from the 16 AND circuits 104 are supplied to a 16 input OR circuit 107. The output of this OR circuit is supplied to an AND circuit 108 to activate such circuit during any bit interval containing an erroneous frame sync indication. $F_0'$ timing pulses are supplied to a second input of AND circuit 108. Consequently, one $F_0'$ timing pulse will be passed by AND circuit 108 for each bit interval which contains an erroneous frame sync indication. The $F_0'$ pulses reaching the output of AND circuit 108 are then counted by a bit error counter 109. After a predetermined number of bit error counts, the counter 109 will produce an output signal transition which sets a control flip-flip 110 to the "one" state. Both the bit error counter 109 and the flip-flop 110 are reset to their "zero" condition at the beginning of each channel by a B1 bit timing pulse. Thus, the error counter 109 operates on a per channel basis to determine the number of erroneous frame sync bits per channel.

Flip-flop 110 is used to control the activation of an AND circuit 111 which has $F_0'$ pulses and B16 pulses (last bit if other than 16 bits per frame) supplied to the other inputs thereof. If the "zero" side output of flip-flop 110 is at the "one" level (flip-flop in "zero" state), then one $F_0'$ timing pulse will be passed by the AND circuit 111 during the occurrence of bit 16. If the error counter 109 has counted less than the predetermined number of errors established by its counting ratio, then this will in fact be the case and an $F_0'$ timing pulse will appear at the output of AND circuit 111 for this channel. If more than the predetermined number of errors is counted for any given channel, then flip-flop circuit 110 will have been set to the "one" state before the occurrence of the B16 timing pulse. Consequently, no $F_0'$ timing pulse will appear at the output of AND circuit 111 for this channel.

For a 16 bit frame sync pattern, the bit error counter 109 may have, for example, a 4:1 counting ratio. The optimum counting ratio is determined by the expected error rate due to the prevailing noise level for the incoming pulse code signal. Bit error counter 109 is of the adjustable type and may be adjusted to provide different counting ratios for different expected error rates or different numbers of bits in the frame sync pattern. To this end, it includes a fixed capacity pulse counter and a matrix circuit for re-cycling the counter at less than its maximum capacity.

For the assumed case of a 4:1 counting ratio in counter 109, the appearance of an $F_0'$ timing pulse at the output of AND circuit 111 indicates that a pulse code pattern has been received which resembles the correct frame sync pattern with not more than three bits thereof being in error. (The fourth error sets flip-flop 110 to the "one" state, thus disabling AND circuit 111.) To a relatively high degree of probability, this is a correct frame sync pattern. Consequently, this $F_0'$ pulse is supplied by way of OR circuit 100 to the flip-flop 101 so as to generate the output frame sync signal on the output line 102. Thus, the seven-stage channel counter 88 (FIG. 1) may be properly reset even through the presence of electrical noise has prevented the reception of a completely correct frame sync pattern.

Note that any frame sync output pulse on output line 102 is also used to reset the four-stage bit counter 31. To this end, the output line 102 is also coupled by way of OR circuit 34 (FIG. 1) to the one-shot multivibrator 35 which resets bit counter 31.

In certain cases where the parallel type two-mode operation just described for frame synchronizer 94 does not provide sufficient flexibility, then the sequential three-mode logic described for the channel synchronizer 36 may instead be used for the frame synchronizer 94. In this case, the output of AND circuit 98 (FIG. 6) would be used in place of the output of AND circuit 39 (FIG. 5), while the output of OR circuit 107 (FIG. 6) would be used in place of the output of OR circuit 53 (FIG. 5). Also, channel timing pulses from the matrix 89, or their equivalent, would need to be used to extend the three-mode logic to a frame basis.

For the case where the clock pulse generator 13 (FIG. 1) is of the type described in the above-mentioned co-pending application Ser. No. 166,538, the frame synchronizer 94 includes suitable circuits for generating a mode reset signal for such clock pulse generator. To this end, the C1 channel timing pulses from matrix 89 are supplied by way of a differentiating circuit 113 to the counting input of a frame error counter 114. This counter 114 serves to produce an output pulse on an output line 115 whenever a predetermined number of C1 pulses have been counted, thus denoting that a predetermined number of frame intervals has elapsed. If, however, the flip-flop 101 should generate an output pulse, then the trailing edge thereof will trigger a one-shot multivibrator 116 which, in turn, resets the frame error counter 114 to a zero-count condition. Thus, a predetermined number of successive frame intervals must elapse without the occurrence of a frame sync pulse at the output of flip-flop 101 before the frame error counter 114 will produce an output pulse on line 115. This predetermined number of frame intervals corresponds to the counting ratio of frame counter 114.

Frame error counter 114 may have, for example, a counting ratio of 5:1, in which case, if no frame sync output pulse is produced for five successive frame intervals, then the frame error counter 114 produces an output pulse on the output line 115. This output pulse is supplied to the mode reset terminal of the clock pulse generator 13 so as to reset this generator to its course acquisition (digital) mode. The counting ratio of counter 114 is made large enough to enable the elapse of sufficient time for the various synchronizing circuits to have gained synchronization under normal operating conditions. If, at the end of this time, synchonization still has not been achieved, then the frame error counter 114 will act to cause the pulse generator 13 to re-examine the wisdom of its current operating mode. If the clock pulse generator 13 is not of the type described in the co-pending application Ser. No. 166,538, or if this feature is not desired, then the circuits 113–116 may be omitted from the present apparatus.

Returning now to FIG. 1 of the drawings, it is seen that the incoming pulse code signal is continuously being read into the shift register 30 and, at the same time, the counters 31 and 88, together with their associated matrix circuits 32 and 89, are operating to produce bit timing and channel timing pulses which can be used to identify the bits and channels which are in the shift register 30 at any given moment. Thus, it is possible to separate the individual pulse code channel patterns and to individually process them in a desired manner. To this end, the 16 stages in the shift register 30 are connected in a parallel manner by way of multiconductor cable 37 to individual ones of 16 transfer gates 117. These transfer gates 117 are, in turn, individually coupled in a parallel manner to the 16 stages of a 16-bit storage register 118. The transfer operation is performed once each channel during the occurrence of the last bit in each channel. This transfer operation is controlled by a B16 bit timing pulse (last bit timing pulse if less than 16 bits per channel) which is supplied directly to the transfer gates 117 and is supplied to the storage register 118 by way of a differentiating circuit 119. The differentiated leading edge of each B16 pulse serves to reset each of the storage register stages to a "zero" condition. The undifferentiated B16 pulse supplied to the transfer gates 117 serves to activate each of these gates so that any of these gates which is coupled to a shift register stage which is in the "one" state will produce an output pulse at the output thereof. These output pulses from the transfer gates 117 serve to set the corresponding stages of storage register 118 to a "one" state. Since the duration of the transfer gate output pulses is longer than that of the differentiated pulses supplied by way of differentiating circuit 119, any storage register stage which receives both types of pulses will be controlled by the transfer gate pulse.

Thus, during bit 16 of each channel, which is the moment at which a complete channel unit just fills the shift register 30, the contents of shift register 30 are transferred in parallel to the storage register 118. Consequently, until the occurrence of a subsequent transfer pulse (B16 pulse) one channel interval later, there prevails at the output of storage register 118 a parallel-type pulse code signal which represents the appropriate data value for the corresponding channel in the serial pulse code signal. This parallel-type pulse code signal may be used to drive the recording heads of a plural-track tape recorder or to drive the parallel inputs of a desired digital computer or other digital data processing apparatus or both.

The parallel pulse code signal appearing at the output of storage register 118 is also supplied in a parallel manner to a parallel-to-serial converter 120. This converter 120 serves to generate for each signal channel an output pulse having a duration which is proportional to the data value represented by the pulse code signal for that channel. Since these duration modulated (PDM) signals are produced one at a time as the individual channel intervals appear at the output of storage register 118, this PDM signal from converter 120 is of the serial type. Converter 120 also generates a pulse number modulated (PNM) signal at the same time that the PDM signals are generated.

Figure 7:
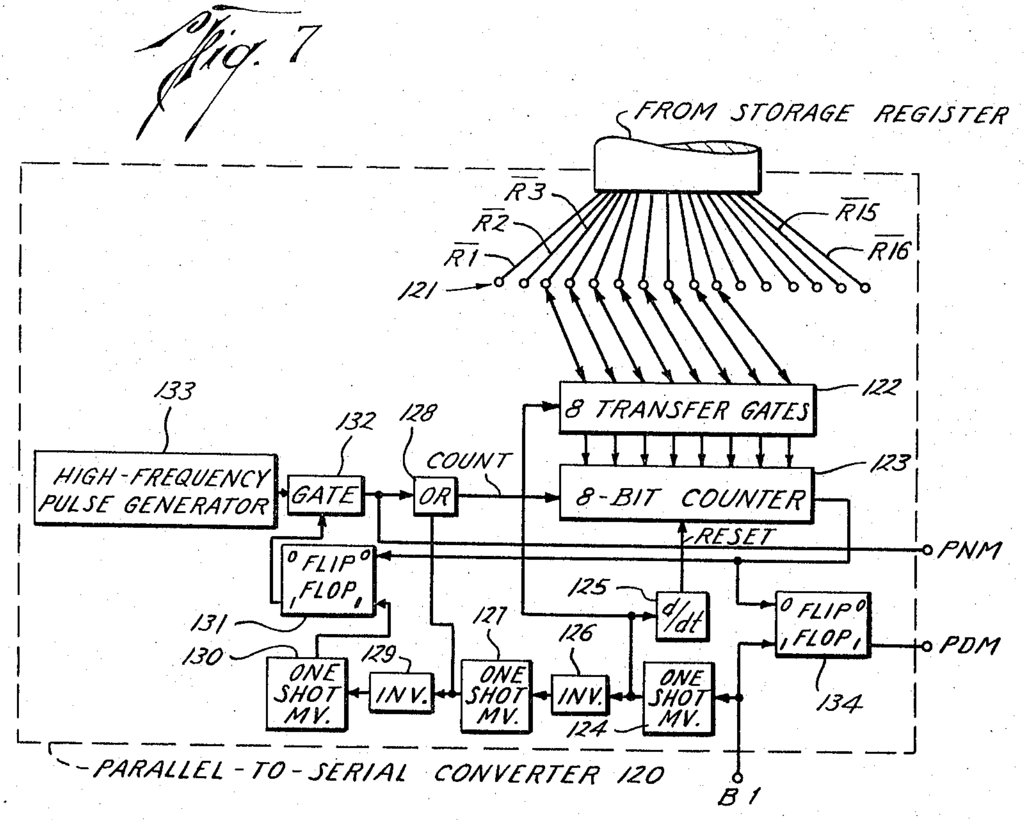
FIG. 7 is a block diagram showing the details of a parallel-to-serial converter used in the FIG. 1 system.

The details of parallel-to-serial converter 120 are shown in FIG. 7 of the drawings. As there seen, the parallel output lines from the storage register 118 are connected to a set of selector contacts 121. Since the converter 120 utilizes only the complement lines from storage register 118, 16 contacts are required. Eight selected ones of these selector contacts 121 are connected to individual ones of eight transfer gates 122. The selected contacts correspond to the eight most significant data bits in each channel interval. Thus, where each channel has more than eight data bits, some loss in resolution occurs. Note, however, that an eight-bit pulse code signal gives the correct data value to within better than ±0.4 percent. For the present case of 16 bits per channel, it is assumed that bits 7–14, inclusive, represent the eight most significant data bits. At the moment of transfer from the shift register 30, these data bits are in register stages R3–R10. Note that the channel sync bits are in stages R1 and R2 at that moment. If a different type of pulse code signal having the eight most significant bits at different locations is received, then the connections to the selector contacts 121 is adjusted accordingly.

Figure 8:
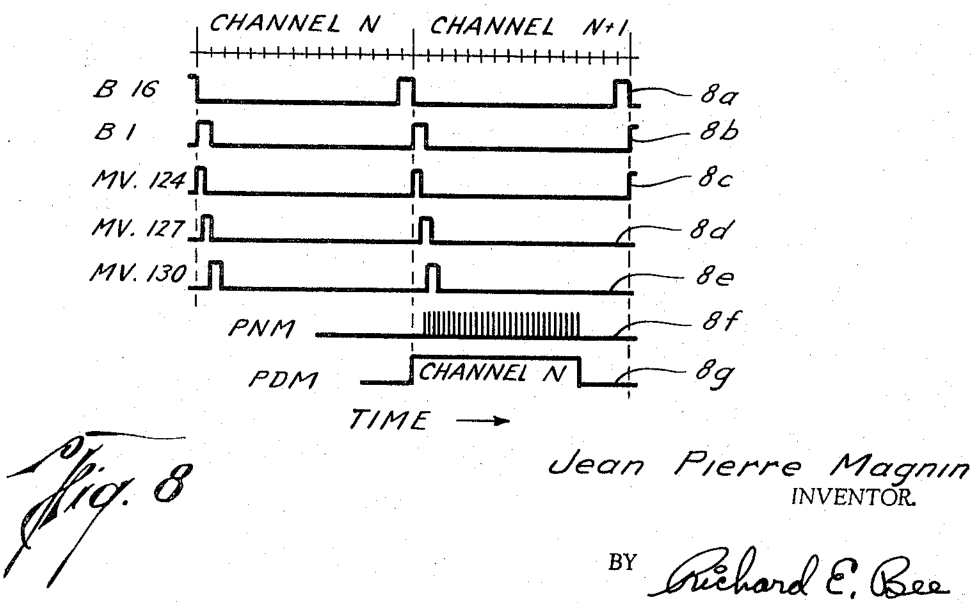
FIG. 8 is a timing diagram used in explaining the operation of the FIG. 7 converter.

In order to visualize the correct timing relationships, reference is had to FIG. 8 of the drawings. Tracing the progression of a typical channel N through the system, it is first noted that a complete channel interval must elapse before channel N is completely read into the shift register 30. During the last bit (B16) of channel N, the 16 bits thereof are simultaneously transferred in a parallel manner to the storage register 118. This is effected by the B16 pulse which occurs at the end of channel N (see waveform 8*a* of FIG. 8). During the next channel interval, channel $N+1$ of the pulse code signal is read into the shift register 30. While this is being done, channel N appears at the output of storage register 118. This channel N data is available for the entire duration of time that is required to read channel $N+1$ into the shift register 30.

The B1 timing pulse (waveform 8*b*) occurred during the first bit of channel $N+1$ is used to effect the parallel transfer of the appropriate channel N data bits from the storage register 118 (by way of selector contacts 121) to the eight stages of an 8-bit counter 123. This is done by suppling the B1 timing pulse to a one-shot multivibrator 124, which is triggered by the leading edge thereof. The resulting output pulse at the output of multivibrator 124 is represented by the second pulse of waveform 8*c* and is supplied directly to the individual stages of the eight transfer gates 122. This multivibrator 124 output pulse is also supplied by way of a differentiating circuit 125 to the reset terminal of the 8-bit counter 123. The differentiated leading edge of the multivibrator 124 output pulse serves to reset the light stages of counter 123 to a "zero" condition. At the same time, the longer duration undifferentiated multivibrator 124 output pulse supplied to the transfer gates 122 is effective to return to a "one" state any of the stages of counter 123 which is connected to a transfer gate which is connected to a register line which is at a "one" level. Thus, the pulse code signal appearing at the chosen selector contacts 121 is read into the eight-bit counter 123. Since the register lines connected to the selector contacts 121 come from the complement or "zero" sides of the storage register stages, this transfer operation is effective to set the 8-bit counter 123 to the complement of the binary number represented by the eight most significant bits in the pulse code signal. (The complement of a binary "one" is a binary "zero.")

The pulse appearing at the output of one-shot multivibrator 124 is also supplied by way of a an inverter circuit 126 to a second one-shot multivibrator 127. Because of the inverting action, multivibrator 127 is triggered by the trailing edge of the multivibrator 124 pulse. The resulting pulse at the output of one-shot multivibrator 127 (second pulse of waveform 8*d*) is then supplied by way of an OR circuit 128 to the counting input of the 8-bit counter 123. This causes the counter 123 to count one count. The output pulse from one-shot multivibrator 127 is also supplied by way of an inverter circuit 129 to a third one-shot multivibrator 130. Because of the inverting action, the now positive-going trailing edge of the pulse from the second multivibrator 127 is effective to trigger the third multivibrator 130. The resulting output pulse from this third multivibrator 130 (second pulse of waveform 8*e*) is supplied to the "one" side input of a flip-flop circuit 131 and serves to set this flip-flop circuit 131 to a "one" state. This, in turn, serves to activate a gate circuit (AND circuit) 132 which is coupled to the "one" side output of flip-flop 131. The activating or gating action enables pulses from a high-frequency pulse generator 133 to pass by way of gate circuit 132 and OR circuit 128 to the counting input of the 8-bit counter 123. Pulse generator 133 is of the free-running type and is constructed to have an operating frequency which is several hundred times higher than the highest channel rate (number of channels per second) which is intended to be handled. Pulse generator 133 is preferably of the crystal-controlled type. The high frequency pulses from generator 133 are capable of driving the counter 123 through a complete counting cycle in less time than the duration of a channel interval.

Since the 8-bit counter 123 is set to the complement value plus one of the pulse code binary number, the number of additional counts required to fill the counter and then return it to zero is exactly equal to the value of the binary number itself. ($n+\bar{n}+1=0$.) Thus, the number of high frequency pulses which is passed by the gate circuit 132 before the 8-bit counter 123 returns to its zero condition (at which return it produces an output pulse) is exactly equal to the number represented by the binary coding of the eight most significant bits in the pulse code signal. The output pulse appearing at the output of counter 123 when it returns to its zero condition is used to set the flip-flop 131 back to its "zero" state. This, in turn, disables the gate circuit 132. There thus appears at the output of gate circuit 132 a short burst of pulses corresponding in number to the data value in channel N of the pulse code signal. This burst of pulses is represented by waveform 8*f* of FIG. 8 and constitutes the pulse number modulation (PNM) output of converter 120.

The pulse duration modulated output is generated by a flip-flop circuit 134. This flip-flop 134 is set to the "one" state by the leading adge of the B1 timing pulse. It is returned to the "zero" state by the output pulse from the 8-bit counter 123. The resulting duration modulated pulse appearing at the "one" side output of flip-flop 134 is represented by waveform 8*g*. This is the duration modulated pulse for channel N. Because of the one channel delay in reading the pulse code signals into the shift register 30, it occurs while channel $N+1$ is being read into the shift register 30.

The operation of the parallel-to-serial converter 120 is repetitive in nature and, hence, after channel $N+1$ is completely read into the shift register 30 and transferred to the storage register 118, it will be used by the converter 120 to develop PNM and PDM output signals for that channel, these signals occurring while channel $N+2$ is being read into the shift register 30. Thus, a PDM pulse and a PNM burst is produced for each of the channel intervals in the incoming pulse code signal. These PDM and PNM signals are passed by normally-active AND circuits 140 and 141 (FIG. 1) to constitute the final signal outputs for the FIG. 1 system.

Returning now to FIG. 1 of the drawings, one final operation remains to be performed to convert the PDM output signal to a commonly-used type of PDM signal. In such commonly-used PDM signals, an end of frame indication (frame sync) is provided by transmitting "zero" signal level during either or both of the last two channels of the frame. In other words, no PDM pulse is transmitted during either or both of these channels. To achieve this result, the AND circuit 140 is disabled for either one or both of the last two channels of the frame. In order to disable the last PDM channel, the C1 timing pulse from matrix 89 is supplied by way of an OR circuit 142 and an inverter circuit 143 to a second input terminal of AND circuit 140. Because of the inverting action provided by inverter 143, this disables AND circuit 140 during the the occurrence of the C1 timing pulse. Because of the one channel delay in reading the pulse code signal into the shaft register 30, this actually disables the last channel in the frame for the PDM signal appearing at the output of converter 120. If it is also desired to disable or blank out the next to the last channel in each PDM frame, then a switch 144 is placed in a closed position and a C128 timing pulse (last one if less than 128) is supplied to the OR circuit 142 and, hence, to the inverter 143 and the AND circuit 140. This blanking action or disabling action is also applied to the PNM signal by way of AND circuit 141. A typical PDM signal with the last two channels blanked out (as indicated by the dash-line construction) is represented by waveform 2*x* of FIG. 2C. This should be compared with the pulse code (PCM) signal of waveform 2*s* to see the considerable difference in the nature of the two signals.

It will sometimes be desirable to supply to the subsequent equipment which utilizes either or both of the output PDM and PNM signals a separate indication of the "end-of-frame" sync pulses. To achieve this, the frame sync signal from the frame synchronizer 94 is also supplied to a one-shot multivibrator 145. This multivibrator 145 is triggered by the positive-going training edge of the frame synchronizer pulse (waveform 2*w*) to, in turn, generate an output pulse which sets a flip-flop circuit 146 to the "one" state. This flip-flop 146 is then returned to the "zero" state by the next occurring B1 timing pulse (waveform 2*t*) which is supplied to the "zero" side input thereof by way of a differentiating circuit 147. There is thus produced a positive-going signal transition at the "zero" side output of flip-flop 146 when it is returned to the "zero" state by the leading edge of this next occurring B1 pulse. This positive-going signal transition is used to trigger a one-shot multivibrator 148 to produce a frame sync output pulse as represented by waveform 2*y*. The use of flip-flop 146 serves to cause this frame sync output pulse to be delayed by one full channel interval compared to the frame sync signal appearing at the output of frame synchronizer 94. This takes into account the one-channel time delay of the output PDM channels relative to the incoming pulse code channels. The use of this separate frame sync signal may render it unnecessary to blank the PNM and PDM signals occurring at the output of the parallel-to-serial converter 120.

A particular advantage of the present signal processing system is that it may be used with the telemetering decoder described in applicant's co-pending application Ser. No. 96,413, entitled "Telemetering Decoder System," filed Mar. 17, 1961, to provide a combined decoder system which is capable of decoding a wider variety of pulse modulation signal types. In this regard, the timing circuits and primary decoding circuits in this co-pending application are constructed for use with PDM type signals. Consequently, to decode a PCM signal it is only required to supply such signal to the present signal processing system before it is applied to the timing and decoding circuits of the co-pending application.

A considerable reduction in the number of circuits required can be achieved in this combined system if separate frame sync pulses are provided by the present signal processing system on a separate output line thereof. The required separate frame sync signals are similar to the frame sync pulses appearing at the output of one-shot multivibrator 148 except that they need to occur slightly after the leading edge of channel 1 of each output frame. This slight delay is provided in the present signal processing system by a flip-flop circuit 150 having its "one" side input coupled to the "zero" side output of flip-flop 146. The "zero" side input of flip-flop 150 is adapted to receive a timing pulse ($t_4$) from the timing circuits of the co-pending application, which timing pulse occurs the necessary length of time after the leading edge of each channel. The same signal transition which triggers multivibrator 148 in this case also sets the flip-flop 150 to the "one" state. Flip-flop 150 is shortly thereafter reset to the "zero" state by the timing pulse from the apparatus of the co-pending application. This produces a positive-going transition at the "zero" side output of flip-flop 150 which is delayed the appropriate amount after the leading edge of the first PDM channel. This positive-going transition triggers an output one-shot multivibrator 151 to produce the appropriate frame sync pulse for the timing circuits of the co-pending application.

When the frame sync at the output of multivibrator 151 is used to control the reset of the seven-bit channel counter in the apparatus of the co-pending application, then the seven-stage channel counter 88, the matrix 89 and the associated reset circuits for the counter 88 of the present system may be omitted from the combined system. Also, the blanking operation performed by circuits 140–143 is no longer required and these circuits may likewise be omitted from the combined system.

From the foregoing descriptions of the various features of the present invention, it is seen that a signal processing system constructed in accordance therewith readily and accurately enables pulse modulated signals of one type to be converted to pulse modulated signals of another type. This signal converting action can be used to advantage in various telemetering systems, among other things, to extend the range of usefulness of such systems with a minimum of increase in complexity.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. A telemetering signal processing system comprising: circuit means for supplying a serial pulse code signal; a plural-bit shift register; circuit means for reading the serial pulse code signal into the shift register for providing a parallel representation thereof; a plural-bit pulse counter; circuit means for transferring in a parallel manner the complement of the shift register signal representation to the pulse counter; circuit means for supplying pulses to the pulse-counting input of the pulse counter; and circuit means for providing an indication of the number of pulses required to fill the pulse counter thereby to provide an indication of the data value represented by the pulse code signal.

2. A telemetering signal processing system comprising: circuit means for supplying a serial pulse code signal; a plural-bit shift register; circuit means for reading the serial pulse code signal into the shift register for providing a parallel representation thereof; a plural-bit pulse counter; circuit means for transferring the complement of the shift register signal representation to the pulse counter; a pulse generator; circuit means for enabling the pulse generator to supply pulses to the pulse counter for counting thereby; and circuit means coupled to both the enabling circuit means and the output of the pulse counter for developing a pulse-type output signal having a characteristic thereof which is representative of the data value represented by the pulse code signal.

3. A telemetering signal processing system comprising: circuit means for supplying a serial pulse code signal; a plural-bit shift register; circuit means for reading the serial pulse code signal into the shift register for providing a parallel representation thereof; a plural-bit pulse counter; circuit means for transferring the complement of the shift register signal representation to the pulse counter; a pulse generator; circuit means for enabling the pulse generator to supply pulses to the pulse counter for counting thereby; and circuit means coupled to both the enabling circuit means and the output of the pulse counter for developing an output pulse having a duration representative of the data value represented by the pulse code signal.

4. A telemetering signal processing system comprising: circuit means for supplying a serial pulse code signal; a plural-bit shift register; circuit means for reading the serial pulse code signal into the shift register for providing a parallel representation thereof; a plural-bit pulse counter; circuit means for transferring the complement of the shift register signal representation to the pulse counter; a pulse generator; circuit means for enabling the pulse generator to supply pulses to the pulse counter for counting thereby; circuit means coupled to the output of the pulse counter for discontinuing the supplying of pulses to the counter; and output circuit means for making available the pulses supplied to the pulse counter, the number of these pulses being representative of the data value represented by the pulse code signal.

5. In a pulse code modulation telemetry decoder, the combination comprising:
circuit means for supplying a succession of plural-bit pulse code telemetry signals;
a plural-stage pulse counter;
circuit means responsive to the pulse code signals for successively setting the pulse counter to the complement value of successive ones of the pulse code signals;
circuit means operative intermediate the complement settings of the pulse counter for supplying pulses to the pulse counter for counting thereby;
and circuit means for providing pulse-type output signals representative of the time intervals required to fill the pulse counter after each complement setting thereof.

6. In a pulse code modulation telemetry decoder, the combination comprising:
circuit means for supplying a succession of plural-bit pulse code telemetry signals;
a plural-stage pulse counter;
circuit means responsive to the pulse code signals for successively setting the pulse counter to the complement value of successive ones of the pulse code signals;
a pulse generator;
circuit means operative intermediate the complement settings of the pulse counter for enabling the pulse generator to supply pulses to the pulse counter for counting thereby;
and circuit means coupled to both the enabling circuit means and the output of the pulse counter for developing pulse-type output signals representative of the time intervals required to fill the pulse counter after each complement setting thereof.

7. In a pulse code modulation telemetry decoder, the combination comprising:
circuit means for supplying a succession of plural-bit pulse code telemetry signals;
a plural-stage pulse counter;
circuit means responsive to the pulse code signals for successively setting the pulse counter to the complement value of successive ones of the pulse code signals;
a pulse generator;
circuit means operative intermediate the complement settings of the pulse counter for enabling the pulse generator to supply pulses to the pulse counter for counting thereby;
and circuit means coupled to both the enabling circuit means and the output of the pulse counter for developing output pulses having durations representative of the time intervals required to fill the pulse counter after each complement setting thereof.

8. In a pulse code modulation telemetry decoder, the combination comprising:
circuit means for supplying a succession of plural-bit pulse code telemetry signals;
a plural-stage pulse counter;
circuit means responsive to the pulse code signals for successively setting the pulse counter to the complement value of successive ones of the pulse code signals;
a pulse generator;
circuit means operative intermediate the complement settings of the pulse counter for enabling the pulse generator to supply pulses to the pulse counter for counting thereby;
circuit means coupled to the output of the pulse counter for discontinuing the supplying of pulses to the pulse counter whenever the pulse counter reaches a predetermined reference condition;
and output circuit means for making available the groups of pulses supplied to the pulse counter intermediate the complement settings thereof, the number of pulses in each group being representative of the data value of the corresponding pulse code signal.

9. In a pulse code telemetry decoder, the combination comprising:
circuit means for supplying a succession of plural-bit pulse code telemetry signals;
a plural-stage pulse counter;
circuit means for successively setting the pulse counter to the complement value of successive ones of the pulse code signals;
circuit means operative intermediate the complement settings of the pulse counter for supplying pulses to pulse counter for counting thereby;
circuit means for providing pulse-type output signals representative of the time intervals required to fill the pulse counter after each complement setting thereof;
and circuit means responsive to the pulse code signals for synchronizing the complement settings of the pulse counter and the supplying of pulses to the pulse counter with the occurrence of the different ones of the plural-bit pulse code signals.

10. A method of converting a serial pulse code modulated signal into a pulse duration modulated signal comprising:
converting the serial pulse code signal into a parallel pulse code signal;
supplying the various bits of the parallel pulse code signal in a parallel manner to the various stages of a plural-stage pulse counter;
changing the operative condition of a pulse waveform generator from a first condition to a second condition;

thereafter supplying periodic pulses to the pulse counter in a serial manner;

and changing the operative condition of the pulse waveform generator back to its first condition upon the occurrence of a predetermined reference condition in the pulse counter, thereby producing a pulse waveform having a duration representative of the data value represented by the coded bits of the pulse code signal.

11. A method of converting a serial pulse code modulated signal into a pulse duration modulated signal comprising:

converting the serial pulse code signal into a parallel pulse code signal;

supplying the various bits of the parallel pulse code signal in a parallel manner to the various stages of a plural-stage pulse counter for setting the counter stages to represent the complements of the coded bits of the pulse code signal;

changing the operative condition of a pulse waveform generator from a first condition to a second condition;

thereafter supplying periodic pulses to the pulse counter in a serial manner;

and changing the operative condition of the pulse waveform generator back to its first condition upon the occurrence of a predetermined reference condition in the pulse counter, thereby producing a pulse waveform having a duration proportional to the data value represented by the coded bits of the pulse code signal.

12. A method of converting a succession of plural-bit serial pulse code modulated signals into a succession of pulse duration modulated signals comprising:

converting a first of the serial pulse code signals into a parallel pulse code signal;

supplying the various bits of the parallel pulse code signal in a parallel manner to the various stages of a plural-stage pulse counter;

changing the operative condition of a pulse waveform generator from a first condition to a second condition;

thereafter supplying periodic pulses to the pulse counter in a serial manner;

changing the operative condition of the pulse waveform generator back to its first condition upon the occurrence of a predetermined reference condition in the pulse counter, thereby producing a pulse waveform having a duration representative of the data value represented by the coded bits of the pulse code signal;

discontinuing the supplying of periodic pulses to the pulse counter after the occurrence of the reference condition therein;

and repeating the foregoing steps for subsequent ones of the pulse code signals.

References Cited by the Examiner

UNITED STATES PATENTS

| | | | |
|---|---|---|---|
| 2,749,440 | 6/1956 | Cartwright | 328—147 |
| 2,849,704 | 8/1958 | Neff | 340—174 |
| 2,853,235 | 9/1958 | Brinster et al. | 235—92 |
| 2,864,948 | 12/1958 | Neff | 328—63 |
| 2,907,004 | 9/1959 | Kun Li Chien et al. | 340—172.5 |
| 3,064,889 | 11/1962 | Hupp | 235—92 |

MAYNARD R. WILBUR, *Primary Examiner.*

MALCOLM A. MORRISON, DARYL W. COOK, *Examiners.*

J. W. MILLER, *Assistant Examiner.*

UNITED STATES PATENT OFFICE

CERTIFICATE OF CORRECTION

Patent No. 3,313,922 April 11, 1967

Jean P. Magnin

It is hereby certified that error appears in the above numbered patent requiring correction and that the said Letters Patent should read as corrected below.

Column 2, line 50, for "drawing" read -- drawings --; column 3, line 27, for "chanel" read -- channel --; same line 27, after "value" insert -- during --; line 73, for "3,249,879" read -- 3,249,878 --; column 5, line 45, after "resented" insert -- by --; column 10, line 33, for "had" read -- has --; line 62, strike out "level"; column 12, line 18, for "98" read -- 89 --; line 27, strike out "output", first occurrence; same line 27, for "C2" read -- C3 --; same line 27, after "line" insert -- when --; line 53, for "as" read -- has --; column 13, line 18, for "+v." read -- +V --; column 14, line 72, for "flip-flip" read -- flip-flop --; column 15, line 44, after "of" insert -- undesired --; column 17, line 55, for "occurred" read -- occurring --; line 69, for "light" read -- eight --; column 18, line 30, for "The" read -- This --; column 19, line 27, for "shaft" read -- shift --; line 49, for "training" read -- trailing --.

Signed and sealed this 28th day of November 1967.

(SEAL)
Attest:

EDWARD M. FLETCHER, JR.
Attesting Officer

EDWARD J. BRENNER
Commissioner of Patents